US009162412B2

(12) United States Patent
Sunaga et al.

(10) Patent No.: US 9,162,412 B2
(45) Date of Patent: Oct. 20, 2015

(54) BRIQUETTING MACHINE CONTROL DEVICE

(71) Applicants: Furukawa Co., Ltd., Tokyo (JP); Furukawa Industrial Machinery Systems Co., Ltd., Tokyo (JP)

(72) Inventors: Yoshiyuki Sunaga, Tochigi (JP); Koji Tsukada, Tochigi (JP); Isao Sekiguchi, Tokyo (JP); Fumio Yuasa, Ibaraki (JP)

(73) Assignees: Furukawa Industrial Machinery Systems Co., Ltd., Tokyo (JP); Furukawa Co., Ltd., Tokyo (JP)

( * ) Notice: Subject to any disclaimer, the term of this patent is extended or adjusted under 35 U.S.C. 154(b) by 17 days.

(21) Appl. No.: 14/088,476

(22) Filed: Nov. 25, 2013

(65) Prior Publication Data

US 2014/0144073 A1 May 29, 2014

(30) Foreign Application Priority Data

Nov. 27, 2012 (JP) ................................ 2012-258588

(51) Int. Cl.

| | |
|---|---|
| ***B29C 43/08*** | (2006.01) |
| ***B30B 11/00*** | (2006.01) |
| ***B30B 11/16*** | (2006.01) |
| ***B30B 15/30*** | (2006.01) |

(52) U.S. Cl.

CPC ............... *B30B 11/006* (2013.01); *B30B 11/16* (2013.01); *B30B 15/308* (2013.01)

(58) Field of Classification Search

CPC ...... B30B 11/006; B30B 11/16; B30B 15/308
USPC .................... 425/145, 149, 79, 150, 237, 363
See application file for complete search history.

(56) References Cited

U.S. PATENT DOCUMENTS

| | | | | | |
|---|---|---|---|---|---|
| 3,550,205 | A | * | 12/1970 | Guseman et al. | 425/78 |
| 3,674,397 | A | * | 7/1972 | Harris | 425/145 |
| 3,824,054 | A | * | 7/1974 | Harris | 425/149 |
| 3,901,635 | A | * | 8/1975 | Greenberger | 425/145 |
| 4,368,165 | A | * | 1/1983 | Bergendahl | 425/145 |
| 5,547,357 | A | * | 8/1996 | Bergendahl | 425/79 |
| 5,666,638 | A | * | 9/1997 | Bergendahl | 419/66 |

FOREIGN PATENT DOCUMENTS

| | | | |
|---|---|---|---|
| JP | 07-308565 | A | 11/1995 |
| JP | 2001-062280 | A | 3/2001 |

* cited by examiner

*Primary Examiner* — Joseph S Del Sole
*Assistant Examiner* — Thukhanh T Nguyen
(74) *Attorney, Agent, or Firm* — Hammer & Associates, P.C.

(57) ABSTRACT

The quality of the briquettes granulated by a briquetting machine is improved. A briquetting machine control device samples the briquette that have been produced to measure an apparent density and a crush strength of the sampled briquette (step S10), and controls each operation set value adjusting unit (4, 6, 7) of the briquetting machine so that the actual measurement values come closer to predefined briquette quality target values (step S20 to step S60).

14 Claims, 5 Drawing Sheets

BRIQUETTING MACHINE CONTROL DEVICE

TECHNICAL FIELD

The present invention relates to a control device of a granulator (briquetting machine) for producing granulated substances (briquettes) by successively supplying materials between a pair of rotating rolls and applying a high-compressive force to the supplied materials.

BACKGROUND ART

The briquetting machine produces the briquettes by successively supplying the materials between the pair of rotating rolls and applying the high-compressive force to the supplied materials (see Patent Documents 1 and 2, for example).

Conventionally, the briquetting machine for adjusting the briquette quality has been controlled by an operator to appropriately maintain the state of the briquetting machine, for example, the pressing load of the rolls, the power of the rolls, and the like. In this situation, as to the quality control in the production process of the briquettes by the briquetting machine, the operator regularly samples a part of the produced briquettes. The states of the sampled briquettes (briquette samples) can be determined as numeric values in consideration of the physical properties such as apparent density, crush strength, or the like. It is noted that the apparent density can be calculated by volume and weight of the briquette.

PRIOR ART DOCUMENTS

Patent Documents

Patent Document 1: JP 2001-62280 A
Patent Document 2: JP H07-308565 A

SUMMARY OF THE INVENTION

Problem to be Solved

The control of the conventional briquetting machine is, however, done by the operator's decision to maintain the state of the machine in an appropriate manner. Hence, such a control method is an indirect one in adjusting the briquette quality. For this reason, the quality control depends on the operator's decision. Even if the pressing load of the rolls and the power of the rolls are appropriately adjusted, there is a problem that the briquette quality is not in a desirable state, in some cases.

Therefore, the present invention has been made in view of the above problem, and has an object to provide a briquetting machine control device capable of improving the quality of the briquettes.

Solution to the Problem

In order to solve the above problem, according to an aspect of the present invention, there is provided a briquetting machine control device for use in a briquetting machine having an operation set value adjusting unit and producing a briquette by successively supplying a material between a pair of rotating rolls and applying a high-compressive force onto the supplied material, the briquetting machine control device comprising: a briquette inspection device for sampling the briquette produced by the briquetting machine to measure a quality of the sampled briquette; and a controller for controlling the operation set value adjusting unit of the briquetting machine so that an actual measurement value about the quality of the briquette measured by the briquette inspection device comes closer to a predefined briquette quality target value, wherein a feeder adjusting unit for adjusting a rotation speed of a screw feeder, a pressing force adjusting unit for adjusting a pressing force of the pair of rotating rolls, and a roll adjusting unit for adjusting rotation speeds of the pair of rotating rolls each operate as the operation set value adjusting unit.

Preferably, the above-described briquetting machine control device further comprise a material characteristic measuring device for sampling the material to be supplied to the briquetting machine to measure a characteristic of the sampled material, wherein the controller comprises a briquette quality target value correcting unit for correcting the predefined briquette quality target value based upon the characteristic of the sampled material measured by the material characteristic measuring device, and wherein the controller controls each of the operation set value adjusting units of the briquetting machine so that the actual measurement value of the briquette measured by the briquette inspection device comes closer to the corrected briquette quality target value that has been corrected by the briquette quality target value correcting unit.

In addition, preferably, in the above-described briquetting machine control device, the controller sets each of operation set values of each of the operation set value adjusting units based upon the characteristic of the sampled material measured by the material characteristic measuring device, and then starts controlling each of the operation set value adjusting units of the briquetting machine, compares the actual measurement value about the quality of the briquette measured by the briquette inspection device with the briquette quality target value, with respect to each of the operation set values that have been set, and corrects each of the operation set values so that the actual measurement value about the quality of the briquette comes closer to the briquette quality target value, and controls each of the operation set value adjusting units of the briquetting machine based upon each of the operation set values that has been corrected.

Advantageous Effects of the Invention

According to the present invention, each of the operation set value adjusting units for adjusting the rotation speed of the screw feeder, the rotation speed of the rolls, the pressing force of the rolls, and the like of the briquetting machine is automatically controlled, based upon control information with sufficient objectivity such as the actual measurement values (measurement data) about the characteristics of the materials obtained by sampling the materials, or the actual measurement values (measurement data) about the quality of the briquettes obtained by sampling the briquettes that are products. Hence, it is possible to achieve more preferable operation situations than the settings of the operation states depending on the operator's decisions in a conventional briquetting machine. This improves the quality of the briquettes.

DESCRIPTION OF EMBODIMENTS

Hereinafter, a briquette production facility provided with a briquetting machine control device according to an embodiment of the present invention will be described with reference to the drawings as necessary.

Figure 1:
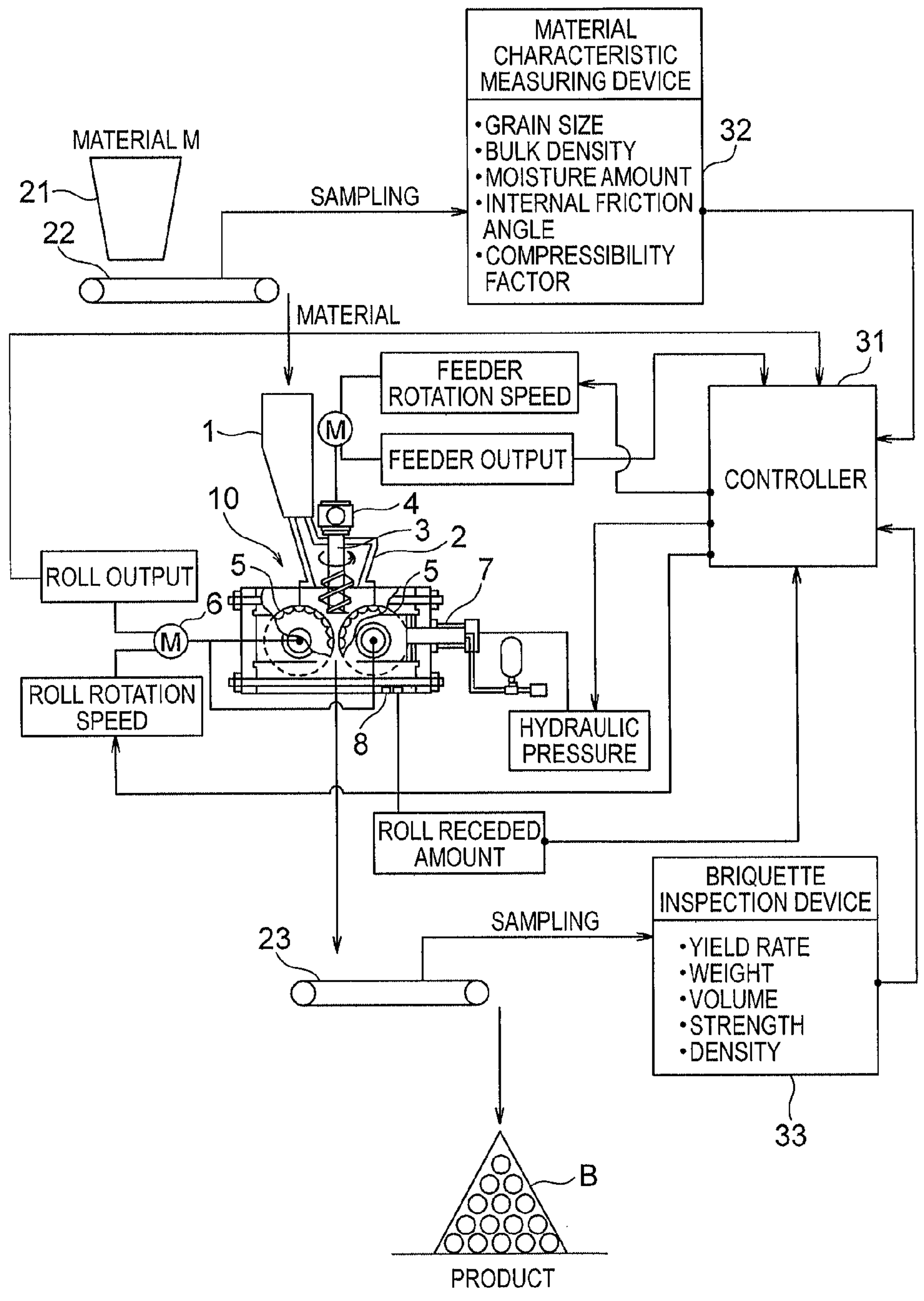
FIG. 1 is a schematic view illustrative of an example of a briquette production facility provided with a briquetting machine control device according to an embodiment of the present invention.

The briquette production facility is provided with a briquetting machine 10 having a material supply inlet 1 at the upper part thereof as illustrated in FIG. 1. A material hopper 21 is arranged on the upstream side of the material supply inlet 1, so that materials or raw materials in the material hopper 21 can be supplied via a material conveyer 22 to the material supply inlet 1. The materials supplied to the material supply inlet 1 are guided to a feed hopper 2 of the briquetting machine 10.

The feed hopper 2 has a funnel shape with its diameter enlarged upwardly, and has therein a screw feeder 3 having a spiral blade. In addition, a feeder driver 4 for driving the screw feeder 3 for rotation is provided at the upper part of the feed hopper 2 as a feeder adjusting unit for adjusting the rotation speed of the screw feeder 3.

An opening is arranged at the lower part of the feed hopper 2, and a pair of rolls 5 are arranged on both of left and right sides of the opening to be opposite to each other with respect to the opening. The pair of rolls 5 has a roll driver 6 as a roll adjusting unit for synchronously driving the rolls 5 at the same time and adjusting their rotation speeds. Further, one of the pair of rolls 5 has a hydraulic device 7 and a roll receded amount measuring sensor 8. The roll receded amount measuring sensor 8 is a measuring instrument capable of measuring the distance (receded amount) between the opposite rolls 5. Moreover, the hydraulic device 7 is a pressing force adjusting unit for adjusting the pressing force of the rolls 5. It is to be noted that each of the feeder driver 4, the roll driver 6, and the hydraulic device 7 corresponds to "an operation set value adjusting unit" described in "Solution to the Problem".

Multiple depressed portions, not illustrated, are formed on each surface of the pair of rolls 5 making pairs, respectively, between the pair of rolls 5. Such paired depressed portions form a shape corresponding to a briquette B to be granulated in cooperation of the pair of rolls 5 with each other. When the rolls 5 are driven for rotation, materials M discharged from the lower part of the feed hopper 2 are pressed between the paired depressed portions. Thus, the briquette B having a desired shape is formed. Then, the shaped briquette B is discharged onto a transportation conveyor 23 from the lower parts of the pair of rolls 5, and is then carried out to the subsequent process by the transportation conveyor 23.

In this situation, the briquette production facility includes: a controller 31 for controlling the briquetting machine; a material characteristic measuring device 32 for measuring the quality of the materials; and a briquette inspection device 33 for measuring the quality of the briquette, as a control device of the briquetting machine 10, as illustrated in FIG. 1.

In detail, the material characteristic measuring device 32 is provided in the vicinity of a material conveyor 22, and is capable of sampling the materials supplied to the briquetting machine 10 and measuring the characteristics thereof. The material characteristic measuring device 32 is configured to be capable of measuring grain size, bulk density, contained moisture amount, internal friction angle, and compressibility factor, as characteristics of the materials. The actual measurement values (measurement data) about material characteristic measured by the material characteristic measuring device 32 are output to the controller 31.

Additionally, the briquette inspection device 33 is arranged in the vicinity of the transportation conveyor 23 to sample the briquettes granulated by the briquetting machine 10, and is capable of measuring at least apparent density and crush strength as qualities of the sampled briquettes. The briquette inspection device 33 according to the present embodiment is capable of measuring the weight, volume, apparent density, and crush strength, as the qualities of the sampled briquettes, and at the same time, are capable of determining the yield rate of the briquettes. The actual measurement values (measurement data) about the qualities of the briquettes measured by the briquette inspection device 33 are also output to the controller 31.

The controller 31 is a controller including a personal computer. To the controller 31, the measurement data about the characteristics of the materials measured by the material characteristic measuring device 32, the measurement data about the qualities of the sampled briquettes measured by the briquette inspection device 33, and the measurement data about the receded amount output from the roll receded amount measuring sensor 8 are respectively input. Moreover, outputs of a feeder drive motor from the feeder driver 4 (hereinafter, also referred to as "feeder kW (kilowatt)") and outputs of a roll drive motor from the roll driver 6 (hereinafter, also referred to as "roll kW (kilowatt)") are also input to the controller 31, as the measurement data. Then, the controller 31 performs a program of a predefined briquetting machine control process to control the feeder driver 4, the roll driver 6, and the hydraulic device 7 based upon the predefined briquetting machine control process.

Figure 2:
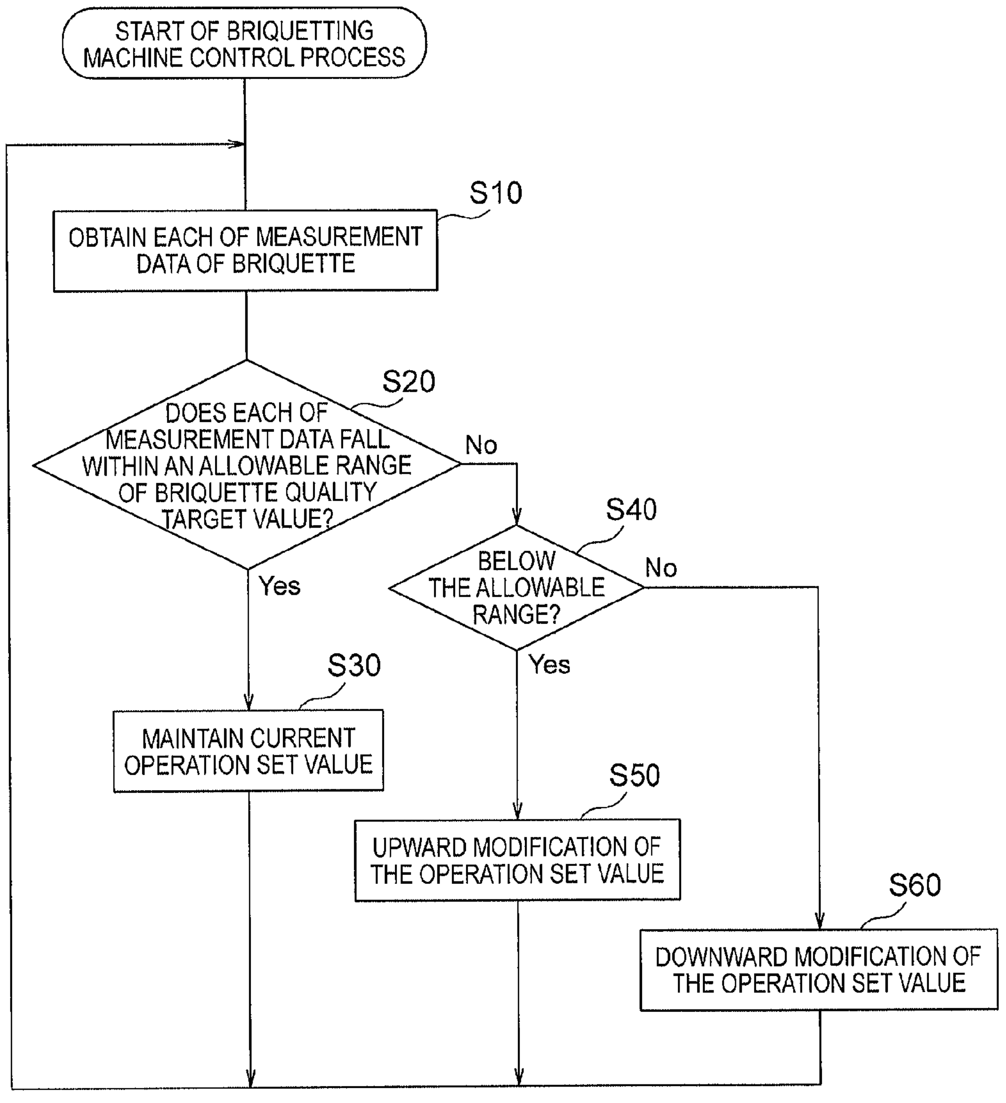
FIG. 2 is a flowchart of a briquetting machine control process performed by a controller.

In the present embodiment, when the controller 31 performs the program of the briquetting machine control process, referring to FIG. 2, firstly, the processing proceeds to step S10 to obtain the measurement data (actual measurement values) of the briquette measured by the briquette inspection device 33. Subsequently, at step S20, it is determined whether or not the measurement data (actual measurement value) of the briquette obtained at step S10 falls within a threshold range (allowable range) between a given upper limit and a given lower limit with respect to a predefined briquette quality target value. That is to say, if the measurement data falls within the predefined allowable range of the briquette quality (Yes), the processing proceeds to step S30. If not (No), the processing proceeds to step S40. The "briquette quality target value" is a target value of each of physical properties (weight, volume, apparent density, crush strength, and the like) of the produced briquettes, and is suitably set according to the material and the product.

At step S30, the processing returns to step S10 with current operation set values being maintained. Herein, the "operation set values" are set values respectively corresponding to the rotation speed of the feeder driver 4, the rotation speed of the roll driver 6, and the pressing force of the hydraulic device 7. At step S40, it is determined whether or not the measurement data (actual measurement value) of the briquette obtained at step S10 is smaller than the given lower threshold with respect to the predefined briquette quality target value. That is to say, if the measurement data is under the allowable range of the predefined briquette quality target value (Yes), the processing proceeds to step S50. If not (No), the processing proceeds to step S60.

At step S50, the current operation set value is changed to a modified operation set value to improve the briquette quality by a predefined value, and the processing returns to step S10. At step S60, since it is determined that the measurement data exceeds the allowable range of the predefined briquette quality target value, the current operation set value is changed to the modified operation set value to drop the briquette quality by a predefined value, and the processing returns to step S10. In this briquetting machine control process, the feeder driver 4, the roll driver 6, and the hydraulic device 7 constituting the operation set value adjusting unit of the briquetting machine 10 are controlled so that the measurement data (actual measurement value) of the briquette comes closer to the predefined briquette quality target value.

The setting of the above "briquette quality target value" will now be described with reference to FIG. 3A to FIG. 3E.

Figure 3A:
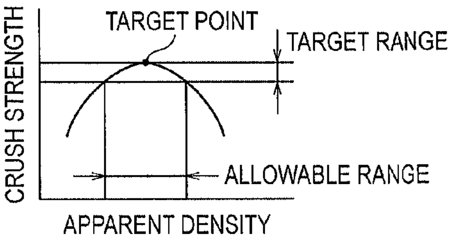
FIG. 3A to FIG. 3E are views illustrative of correlations between briquette quality and adjustments by an operation set value adjusting unit, and relationships between an apparent density and a crush strength of the briquette (quality correlation line)

As to the "briquette quality target value", a correlation line (i.e., a graph indicating a relationship between the apparent density and the crush strength) illustrated in FIG. 3A is obtained as a baseline for initial settings, with the use of results obtained by sampling the materials supplied to the briquetting machine beforehand, measuring by the material characteristic measuring device 32 the characteristics of the materials beforehand, and measuring by the briquette inspection device 33 the qualities (i.e., the apparent density and the crush strength) of the briquettes produced from the materials. Such results may be stored by the controller 31 as table data, for example, or may be stored as a function expression indicating the correlation illustrated in FIG. 3A. As illustrated in FIG. 3A, the relationship of the crush strength of the briquette with respect to the apparent density of the briquette indicates a mountain-shaped correlation. This is because the briquette is broken at the time of forming and cannot be formed, if the apparent density is tried to be higher than a certain value. As the characteristic of the briquette, a higher crush strength is more desirable. Hence, in the present embodiment, in order to set the top of the mountain shape in the quality correlation as a target point, a predefined allowable range on both sides of the mountain shape is set as allowable ranges of the apparent density of the briquette. It is to be noted that the top of the mountain shape in the quality correlation line set as a target point is an example. In some cases, a clear mountain shape cannot be shown as a peak. In such cases, instead of the peak, density of a desired quality can be set to the predefined range.

On the other hand, the rotation speed of the screw feeder 3, the pressing force of the pair of rolls 5, and the rotation speed of the pair of rolls 5, with respect to the briquette quality (i.e., the apparent density), can be defined and managed based upon the correlation with the apparent density of the briquette.

Figure 3B:
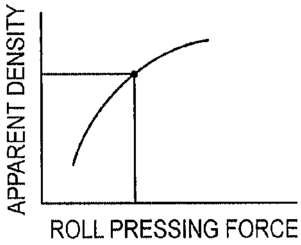

Specifically, referring to FIG. 3B, the apparent density of the briquette represents a positive correlation with respect to the pressing force of the pair of rolls 5. That is to say, the apparent density of the briquette is increased as the pressing force of the pair of the rolls 5 is higher, whereas the apparent density of the briquette is decreased as the pressing force of the pair of the rolls 5 is lower. In addition, referring to FIG. 3C, the apparent density of the briquette represents a negative correlation with respect to the rotation speed of the pair of rolls 5. That is to say, the apparent density of the briquette is decreased as the roll speed of the pair of the rolls 5 is higher, whereas the apparent density of the briquette is increased as the roll speed of the pair of the rolls 5 is lower. In particular, when the rotation speed exceeds a given speed, the apparent density is drastically decreased. Furthermore, referring to FIG. 3D, the apparent density of the briquette has a positive correlation with respect to the rotation speed of the screw feeder 3, and this correlation has a linear relationship with the above-described "roll kW".

Figure 3C:
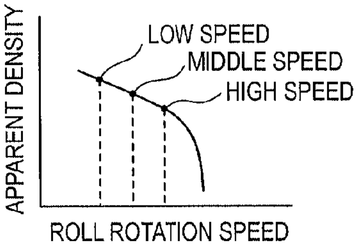
Figure 3D:
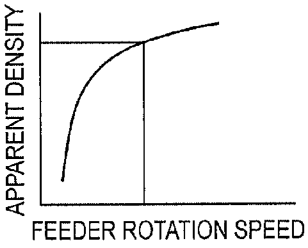
Figure 3E:
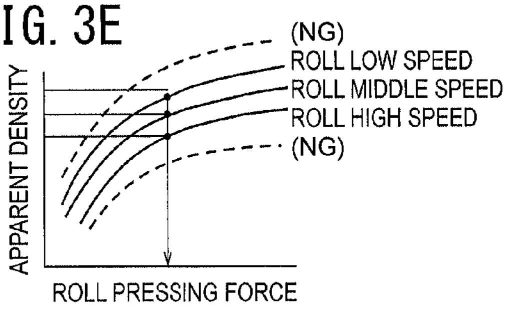

Then, referring to FIG. 3E, the apparent density of the briquette has a positive correlation with respect to pressing force of the pair of rolls 5, from FIG. 3B and FIG. 3C. Therefore, the above-described allowable range of the apparent density is set in consideration of the predefined range of the rotation speed of the pair of rolls 5 (the range of the graph indicating from the low speed to the high speed of the rolls) illustrated in FIG. 3E. In this manner, the managed range of the above-described "roll kW" is set to correspond to the predefined range, and the rotation speed of the screw feeder is controlled while the controller 31 is monitoring the "roll kW" to be a (constant) value within the managed range. Thus, it is possible to operate and manage the briquetting machine so that the apparent density (and the crush strength) of the briquette falls within the target allowable range on the quality correlation line (step S20 to step S30).

Herein, when the measurement data (actual measurement value) of the briquette is made to come closer to the predefined briquette quality target value, the specific feedback control of the "operation set value adjusting unit" is performed as follows. For example, in a case where the measurement data (actual measurement value) lies on a quality correlation line A and the apparent density and the crush strength of the briquette are both lower than the predefined range of the briquette quality target value as indicated by *(1) mark in FIG. 4 (step S40: Yes), the controller 31 manages the roll driver 6, the feeder driver 4, and the hydraulic device 7, by firstly giving to the roll driver 6 an instruction of maintaining the initial set value of the rotation speed (or decreasing it by a given value), giving to the feeder driver 4 an instruction of increasing the rotation speed of the screw feeder 3 by a given value, and giving to the hydraulic device 7 an instruction of increasing the pressing force by a given amount (step S50).

Figure 4:
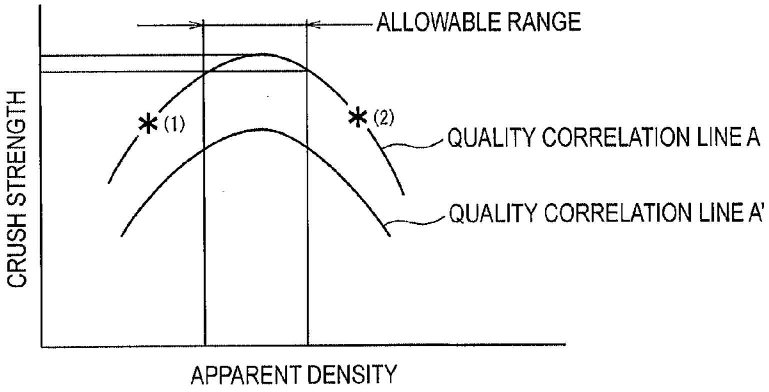
FIG. 4 is a view illustrative of a relationship between the apparent density and the crush strength of the briquette (quality correlation line)

For example, in a case where the measurement data (actual measurement value) lies on the quality correlation line A and the apparent density of the briquette is higher than the predefined range of the briquette quality target value and the crush strength of the briquette is lower than the predefined range of the briquette quality target value as indicated by *(2) mark in FIG. 4 (step S40: No), the controller 31 is capable of managing the feeder driver 4, the roll driver 6, and the hydraulic device 7, by giving to the roll driver 6 an instruction of maintaining the initial set value of the rotation speed (or increasing by a given value thereof), giving to the feeder driver 4 an instruction of decreasing the rotation speed of the screw feeder 3 by a given value, and giving an instruction of decreasing the pressing force by a given amount (step S60).

Which operation set value adjusting unit should be made to correspond to a change in which measurement data (actual measurement value) may naturally change depending on the different material, and depending on the type, the size, and the like of the briquettes to be produced. Therefore, the above quality correlation line, the operation set value, and its setting order are appropriately determined based upon the data of test results or the like that have been performed beforehand in accordance with the conditions on that occasion.

For example, the quality correlation line A is set to be the baseline in FIG. 4. In the above embodiment, an example of controlling the operation set value based upon the baseline has been illustrated. However, if another material is used, the quality correlation line A' is set to be the baseline due to characteristics of the material, in some cases. That is to say, the quality correlation line changes depending on a difference in the moisture amount, grain size distribution, or the like of each characteristic of the materials, in some cases. For this reason, the quality correlation line is individually set in accordance with the difference in the characteristic of the material, and the target range of the apparent density changes in accordance therewith.

In other words, in such a case, the baseline serving as the basis of settings deviates from the quality correlation line A. Accordingly, if the quality correlation line A' is stored as data beforehand, the controller 31 starts the corresponding control with the quality correlation line A' changed to a new baseline.

Unless the quality correlation line A' is stored as the data beforehand, the material characteristic measuring device 32 measures the characteristics of the materials, and in addition, the briquette inspection device 33 measures the quality of the briquettes produced with the materials and the new quality correlation line A' is obtained from the quality results to be stored as a new baseline. Then, when the baseline corresponding to the characteristics of the materials is determined to be the new quality correlation line A', the target range of the apparent density is set in accordance therewith. The roll pressing force and the roll rotation speed are determined to be conditions of starting the operation, based on the set target range. Thus, the operation of the briquetting machine starts, and then, it is controlled as described above so that the apparent density becomes constant (a target value), that is the pressing force of the pair of rolls becomes constant. For example, since the roll pressing force is proportional to the output from the roll drive motor (roll kW), the rotation speed of the feeder is controlled so that the output from the roll drive motor is constant. Modifications of the case where the quality correlation line changes will be described later.

Next, control and operation effects of the briquetting machine in the above-described briquette production facility will be described.

When the above-described briquette production facility is operated, the controller 31 starts operating the feeder driver 4, the roll driver 6, and the hydraulic device 7 with the predefined operation set values of the briquetting machine 10 being as the initial operation set values, based upon the initial operation set values. When the operation starts, the materials are successively supplied between the pair of rolls 5 that are rotating, and the briquette B is produced by the pair of rolls 5 applying a high-compressive force onto the supplied material M.

When the briquette is produced, the briquette inspection device 33 samples the briquette granulated by the briquetting machine 10 and measures the apparent density and the crush strength of the sampled briquette. The controller 31 controls each operation set value adjusting unit of the briquetting machine 10, while controlling each operation set value adjusting unit of the briquetting machine 10 so that the actual measurement value of the measured briquette comes closer to the predefined briquette quality target value in the processes of steps S10 to S60 of the above briquette control process, successively supplies the materials between the pair of rotating rolls, and applies the high-compressive force onto the supplied materials, for production of the briquettes.

That is, according to the briquette production facility, the briquette inspection device 33 and the controller 31 are included as a control device of the briquetting machine 10.

The controller 31 automatically controls the feeder driver 4, the roll driver 6, and the hydraulic device 7 of the briquetting machine 10 so that the measurement data of the actual measurement values of the briquettes measured by the briquette inspection device 33 come closer to the predefined briquette quality target values. It is thus possible to provide more suitable operation situations than the settings of the operation states depending on the operator's decision in the conventional briquetting machine. Accordingly, it is possible to improve the quality of the briquettes.

It is to be noted that the briquetting machine control device according to the present invention is not limited to the above embodiment. Various modifications may occur without departing from the scope of the present invention.

For example, in the above embodiment, an example has been described such that as to the measurement data of the characteristics of the materials measured by the material characteristic measuring device 32, the materials to be supplied to the briquetting machine are sampled beforehand, the characteristics of the materials are measured beforehand, and the quality correlation line is obtained as a baseline for the initial settings from the quality results of the briquettes produced from the materials measured by the briquette inspection device 33. No description has been given as the control target of the controller 31 in the control device. However, the controller 31 can be further provided with a configuration of correcting the predefined briquette quality target value (briquette quality target value correcting unit) depending upon the measurement data of the characteristics of the materials measured by the material characteristic measuring device 32. Then, the controller 31 can be configured to control the feeder driver 4, the roll driver 6, and the hydraulic device 7 of the briquetting machine 10 so that the measurement data of the actual measurement values of the briquettes measured by the briquette inspection device 33 come closer to the briquette quality target value corrected by the briquette quality target value correcting unit.

Figure 5:
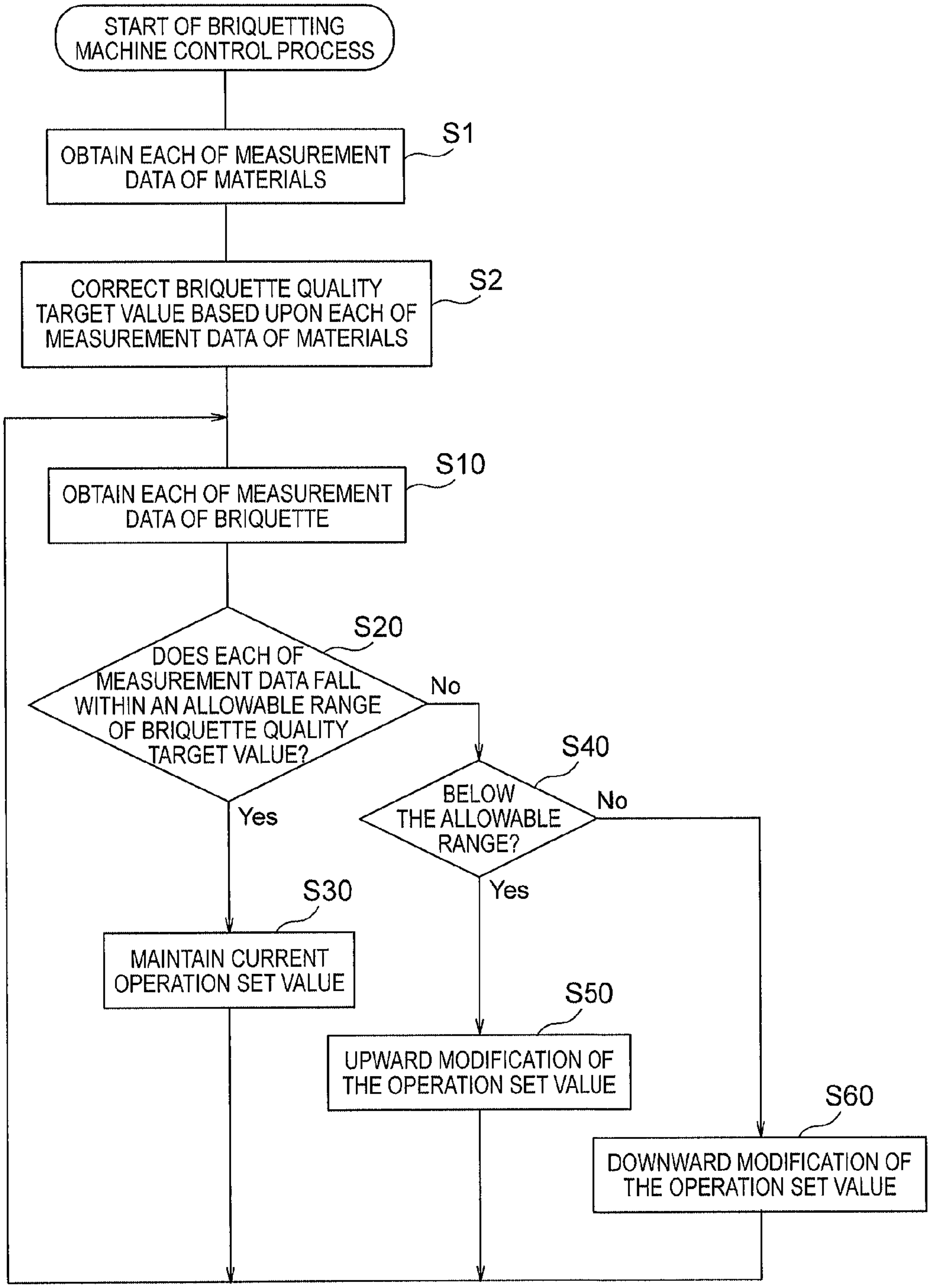
FIG. 5 is a view illustrative of a modification of the flowchart of the briquetting machine control process performed by the controller.

To be specific, as indicated by a first modification in FIG. 5, for example, when the controller 31 performs the program of the briquetting machine control process, firstly, the processing proceeds to step S1 to obtain the measurement data of the characteristics of the materials measured by the material characteristic measuring device 32. At the next step S2, the predefined briquette quality target value is corrected based upon the measurement data of the characteristics of the materials measured by the material characteristic measuring device 32. The subsequent processes are same with steps S10 to S60 in the above embodiment.

When the briquettes are produced in the briquette production facility according to the first modification, the materials to be supplied to the briquetting machine 10 are sampled and the characteristics thereof are measured by the material characteristic measuring device 32 (step S1). The briquette quality target value is corrected based upon the characteristics of the measured materials (step S2). After that, the briquettes are produced in the same manner with the above embodiment.

That is, according to the first modification, it is possible to produce the briquettes by successively supplying the materials between the pair of rolls and applying the high-compressive force onto the supplied materials, while each operation set value adjusting unit of the briquetting machine 10 is being controlled so that the actual measurement values of the briquettes measured by sampling by the briquette inspection device 33 come closer to the briquette quality target value corrected by the briquette quality target value correcting unit. Accordingly, for example, in the case where there are the quality correlation line A and the quality correlation line A' as illustrated in FIG. 4 and the briquette quality target value is based upon the quality correlation line A, it is possible to correct and adjust the briquette quality target value to the quality correlation line A' based upon the measurement data of the characteristics of the materials. In this manner, the sampled briquette is automatically measured to obtain the measurement data of the apparent density and the crush strength. If the materials are not changed, it is sufficient to control the rotation speed of the feeder so that the output from the roll drive motor is constant only on the baseline corresponding to the characteristics of the materials. In contrast, if there is measurement data that deviates from the baseline, it is possible to correct the baseline itself by determining that the characteristics of the materials themselves, not the characteristics of machinery, are changed according to the first modification. Hence, it is more preferable for improving the quality of the briquettes.

Figure 6:
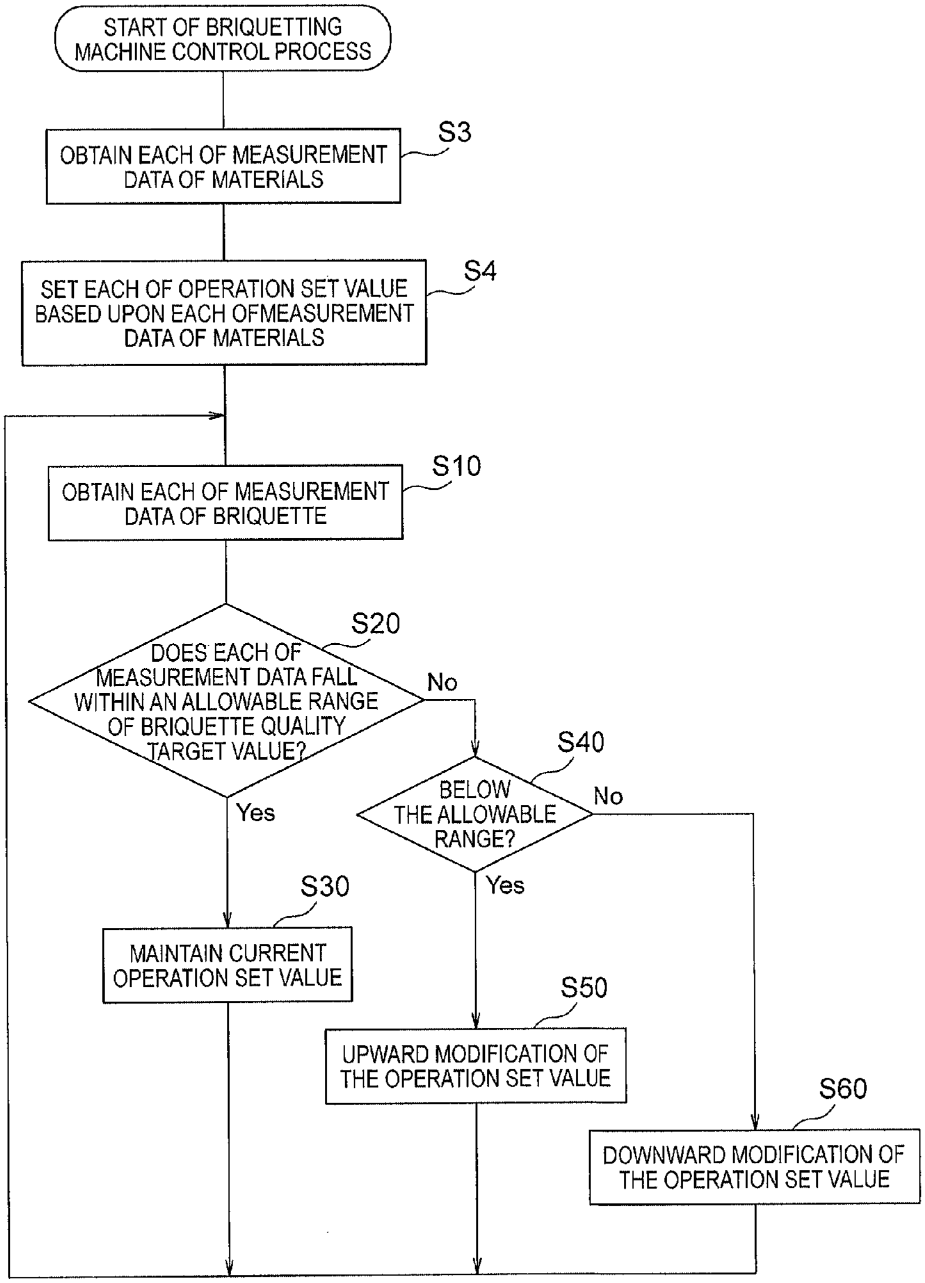
FIG. 6 is a view illustrative of another modification of the flowchart of the briquetting machine control process performed by the controller.

Furthermore, as indicated by a second modification in FIG. 6, for example, when the controller 31 performs the program of the briquetting machine control process, the processing proceeds to step S3 to obtain the measurement data of the characteristics of the materials measured by the material characteristic measuring device 32. At next step S4, each operation set value of the feeder driver 4, the roll driver 6, and the hydraulic device 7 may be set based upon the measurement data of the characteristics of the materials measured by the material characteristic measuring device 32. The subsequent processes are same with steps S10 to S60 in the above embodiment.

When the briquettes are produced in the briquette production facility according to the second modification, the materials to be supplied to the briquetting machine 10 are sampled and the characteristics thereof are measured by the material characteristic measuring device 32 (step S3). Each operation set value is determined based upon the characteristics of the measured materials (step S4). After that, the briquettes are produced in the same manner with the above embodiment.

That is, when the briquettes are produced in the briquette production facility according to the second modification, the controller 31 sets each operation set value of the feeder driver 4, the roll driver 6, and the hydraulic device 7, based upon the characteristics of the materials measured by the material characteristic measuring device 32. After that, the controller 31 starts the control of each operation set value adjusting unit of the briquetting machine 10. Then, the briquettes are produced by successively supplying the materials between the pair of rotating rolls and applying the high-compressive force onto the supplied materials, while sampling the briquettes produced with the operation set value that has been set based upon the characteristics of the materials, comparing the actual measurement value of the briquette measured by the briquette inspection device 33 with the briquette quality target value, correcting each operation set value so that the measurement data of the actual measurement value of the briquette comes closer to the briquette quality target value, and controlling each operation set value adjusting unit of the briquetting machine 10 based upon each operation set value that has been corrected. Accordingly, according to the second modification, for example, in the case where there are the quality correlation line A and the quality correlation line A' as illustrated in FIG. 4 and the operation set value is based upon the quality correlation line A, the operation starts after each operation set value is set to be adjusted to the quality correlation line A' based upon the actually measured characteristics of the materials. This is more preferable for improving the quality of the briquettes.

Furthermore, although not illustrated, the controller 31 can be configured to perform the program of the briquetting machine control process including the steps S1, S2, S3 and S4 described in the first and second modifications and all the processes at steps S10 to S60 in the above embodiment. With such a configuration, the briquette quality target value is corrected based upon the measurement data of the characteristics of the materials, and in addition, the operation starts after each operation set value is set based upon the actually measured characteristics of the materials. Therefore, this is more preferable for improving the quality of the briquettes.

REFERENCE SIGNS LIST

1 material supply inlet
2 feed hopper
3 screw feeder
4 feeder driver
5 roll
6 roll driver
7 hydraulic device
8 roll receded amount measuring sensor
10 granulator (briquetting machine)
21 material hopper
22 material conveyor
23 transportation conveyor
31 controller
32 material characteristic measuring device
33 briquette inspection device
B briquette
M material

The invention claimed is:

1. A briquetting machine control device for use in a briquetting machine having an operation set value adjusting unit and producing a briquette by successively supplying a material between a pair of rotating rolls and applying a high-compressive force onto the supplied material, the briquetting machine control device comprising:

a briquette inspection device configured to sample the briquette produced by the briquetting machine to measure a quality of the sampled briquette; and a controller configured to receive an input of an actual measurement value about the quality of the sampled briquette measured by the briquette inspection device, determine whether or not the actual measurement value about the quality of the sampled briquette that has been received falls within a threshold range between an upper limit and a lower limit with respect to a predefined briquette quality target value, and control the operation set value adjusting unit of the briquetting machine so that the actual measurement value about the quality of the briquette measured by the briquette inspection device comes closer to the predefined briquette quality target value, when the actual measurement value about the quality of the sampled briquette that has been received does not fall within the threshold range, wherein a feeder adjusting unit for receiving an input of a adjusting a rotation speed of a screw feeder, a pressing force adjusting unit for adjusting a pressing force of the pair of rotating rolls, and a roll adjusting unit for adjusting rotation speeds of the pair of rotating rolls each operate as the operation set value adjusting unit.

2. The briquetting machine control device according to claim 1, further comprising a material characteristic measuring device for sampling the material to be supplied to the briquetting machine to measure a characteristic of the sampled material, wherein the controller comprises a briquette quality target value correcting unit for correcting the predefined briquette quality target value based upon the characteristic of the sampled material measured by the material characteristic measuring device, and wherein the controller controls each of the operation set value adjusting units of the briquetting machine so that the actual measurement value of the briquette measured by the briquette inspection device comes closer to the corrected briquette quality target value that has been corrected by the briquette quality target value correcting unit.

3. The briquetting machine control device according to claim 2, wherein the controller sets each of operation set values of each of the operation set value adjusting units based upon the characteristic of the sampled material measured by the material characteristic measuring device, and then starts controlling each of the operation set value adjusting units of the briquetting machine, compares the actual measurement value about the quality of the briquette measured by the briquette inspection device with the briquette quality target value, with respect to each of the operation set values that have been set, and corrects each of the operation set values so that the actual measurement value about the quality of the briquette comes closer to the briquette quality target value, and controls each of the operation set value adjusting units of the briquetting machine based upon each of the operation set values that has been corrected.

4. The briquetting machine control device according to claim 1, wherein the quality of the sampled briquette includes a weight of the sampled briquette produced by the briquetting machine.

5. The briquetting machine control device according to claim 1, wherein the quality of the sampled briquette includes a volume of the sampled briquette produced by the briquetting machine.

6. The briquetting machine control device according to claim 1, wherein the quality of the sampled briquette includes a crush strength of the sampled briquette produced by the briquetting machine.

7. The briquetting machine control device according to claim 6, wherein the quality of the sampled briquette further includes an apparent density of the sampled briquette produced by the briquetting machine.

8. The briquetting machine control device according to claim 1, wherein the quality of the sampled briquette includes an apparent density of the sampled briquette produced by the briquetting machine.

9. A briquetting machine control device for use in a briquetting machine having an operation set value adjusting unit and producing a briquette by successively supplying a material between a pair of rotating rolls and applying a high-compressive force onto the supplied material, the briquetting machine control device comprising:

a briquette inspection device configured to sample the briquette produced by the briquetting machine to measure a quality of the sampled briquette; and a controller configured to receive an input of an actual measurement value about the quality of the sampled briquette measured by the briquette inspection device, determine whether or not the actual measurement value about the quality of the sampled briquette that has been received falls within a threshold range between an upper limit and a lower limit with respect to a predefined briquette quality target value, and control the operation set value adjusting unit of the briquetting machine so that the actual measurement value about the quality of the briquette measured by the briquette inspection device comes closer to the predefined briquette quality target value, when the actual measurement value about the quality of the sampled briquette that has been received does not fall within the threshold range, wherein when the actual measurement value about the quality of the sampled briquette that has been received is under the threshold range, the controller is configured to change a current operation set value and improve the quality of the briquette by a predefined value, wherein when the actual measurement value about the quality of the sampled briquette that has been received is not under the threshold range, the controller is configured to change the current operation set value and drop the quality of the briquette by a predefined value, and wherein a feeder adjusting unit for receiving an input of a adjusting a rotation speed of a screw feeder, a pressing force adjusting unit for adjusting a pressing force of the pair of rotating rolls, and a roll adjusting unit for adjusting rotation speeds of the pair of rotating rolls each operate as the operation set value adjusting unit.

10. The briquetting machine control device according to claim 9, wherein the quality of the sampled briquette includes a weight of the sampled briquette produced by the briquetting machine.

11. The briquetting machine control device according to claim 9, wherein the quality of the sampled briquette includes a volume of the sampled briquette produced by the briquetting machine.

12. The briquetting machine control device according to claim 9, wherein the quality of the sampled briquette includes a crush strength of the sampled briquette produced by the briquetting machine.

13. The briquetting machine control device according to claim 12, wherein the quality of the sampled briquette further includes an apparent density of the sampled briquette produced by the briquetting machine.

14. The briquetting machine control device according to claim 9, wherein the quality of the sampled briquette includes an apparent density of the sampled briquette produced by the briquetting machine.

* * * * *